United States Patent [19]

Auerweck et al.

[11] Patent Number: 4,541,282

[45] Date of Patent: Sep. 17, 1985

[54] METHOD OF PRODUCING A UNIFORM FLUID-TIGHT SEAL BETWEEN A THIN, FLEXIBLE MEMBER AND A SUPPORT AND AN APPARATUS UTILIZING THE SAME

[75] Inventors: Ferdinand J. Auerweck, Hatboro; Donald J. Bulgarelli, Havertown; Curtis A. Roller, Willow Grove; Francis R. Varrese, Ambler, all of Pa.

[73] Assignee: Honeywell Inc., Minneapolis, Minn.

[21] Appl. No.: 586,599

[22] Filed: Mar. 6, 1984

[51] Int. Cl.⁴ .............................................. G01L 7/08
[52] U.S. Cl. ................................ 73/715; 29/156.4 R; 228/174; 228/215
[58] Field of Search ........................ 73/756, 715–728; 92/103 M, 102; 29/156.4 R; 228/174, 215

[56] References Cited

U.S. PATENT DOCUMENTS

| | | | |
|---|---|---|---|
| 1,252,142 | 1/1918 | Murray | 228/174 |
| 1,465,768 | 8/1923 | Mapel | 73/715 |
| 3,094,876 | 6/1963 | Hastings | 73/716 |
| 3,375,718 | 4/1968 | Robinson et al. | 73/715 |
| 4,136,603 | 1/1979 | Doyle, Jr. | 92/103 M |

FOREIGN PATENT DOCUMENTS 1289714  4/1961  France ................... 228/174

0089374  7/1981  Japan .................... 228/174

*Primary Examiner*—Donald O. Woodiel
*Attorney, Agent, or Firm*—Mitchell J. Halista; Trevor B. Joike

[57] ABSTRACT

A method of producing a fluid-tight seal between a thin, flexible member and a support including the steps of providing a moat for receiving excess braze material on an external surface of a member support and a dam adjacent to the moat to confine the excess braze material to the moat and having a height above the bottom of the moat to accommodate a brazing of the member to the external surface, positioning the member to extend across the dam and the surface while contacting only the top of the dam and brazing the member to the surface while maintaining the contact between the top of the dam and the member to uniformly support the member. An apparatus using this method to produce a fluid-tight seal for a thin, flexible member comprises a support surface, an excess braze material receiving moat on said surface, a dam adjacent to one side of said moat and having a height above the bottom of said moat to contact said member while accommmodating a brazing of said member to said surface and a brazing material means between said member and said surface adjacent to the other side of said moat.

8 Claims, 4 Drawing Figures

METHOD OF PRODUCING A UNIFORM FLUID-TIGHT SEAL BETWEEN A THIN, FLEXIBLE MEMBER AND A SUPPORT AND AN APPARATUS UTILIZING THE SAME

BACKGROUND OF THE INVENTION

1. Field of the Invention

The present invention relates to bonding techniques. Most specifically, the present invention is directed to a method for bonding a thin, flexible member to a support and an apparatus utilizing such as bonding method.

SUMMARY OF THE INVENTION

In accomplishing this and other objects, there has been provided, in accordance with the present invention an improved method for uniformly bonding a thin, flexible member to a support and an apparatus utilizing such a method.

In accomplishing this and other objects, there has been provided, in accordance with the present invention a method of producing a fluid-tight seal between a thin, flexible member and a support including the steps of providing a moat for receiving excess braze material on an external surface of a member support and a dam adjacent to the moat to cofine the excesss braze material to the moat and having a height above the bottom of the moat to accommodate a brazing of the member to the external surface, positioning the member to extend across the dam and the surface while contacting only the top of the dam and brazing the member to the surface while maintaining the contact between the top of the dam and the member to uniformly support the member. An apparatus using this method to produce a fluid-tight seal for a thin, flexible member comprises a support surface, an excess braze material receiving moat on said surface, a dam adjacent to one side of said moat and havng a height above the bottom of said moat to contact said member while accommodating a brazing of said member to said surface and a brazing material means between said member and said surface adjacent to the other side of said moat.

BRIEF DESCRIPTION OF THE DRAWING

A better understanding of the present invention may be had when the following detailed description is read in connection with the drawings in which.

DESCRIPTION OF THE PREFERRED EMBODIMENT

Detailed Description

Figure 1:
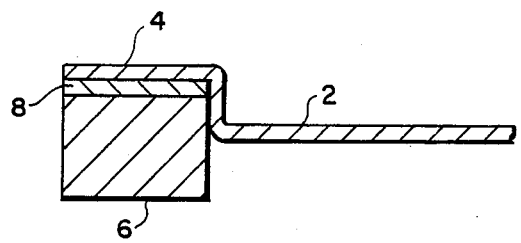
FIG. 1 is a cross-section of a structure utilizing a prior art technique for bonding a thin, flexible member to a substrate.

Referring to FIG. 1 in more detail there is shown a cross-sectional illustration of a structural connection utilizing a prior art technique for bonding a thin, flexible member to a substrate. The thin, flexible member may be in the form of a diaphragm 2 which is attached at its peripheral edge 4 to an annular support substrate 6. A braze material in the form of a braze layer 8 is arranged between the outer peripheral edge 4 of the diaphragm 2 and the substrate 6 to provide a fluid-tight bond between the diaphragm 2 and the substrate 6. Such a bonding technique exhibited a problem occasioned by the flow of the braze material 8 radially inwardly of the support substrate 6 to distort the adjacent portion of the diaphragm 2 and to produce a subsequent non-uniform operation of the diaphragm 2 in its working environment.

Figure 2:
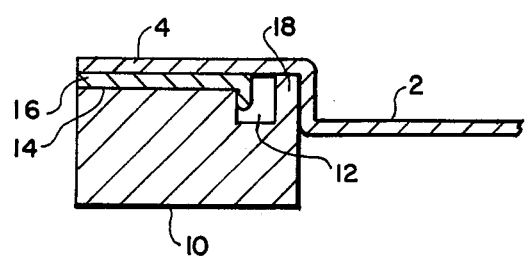
FIG. 2 is a cross-section of a bonded flexible member structure showing an example of the present invention.

In FIG. 2, there is shown a cross-sectional illustration of a diaphragm to substrate bond utilizing the method of the present invention. In this method, the diaphragm 2 is attached to an annular support substrate 10 having a radially inwardly arranged continuous annular groove 12. The surface of the substrate 10 extending between the radially outward side of the groove 12 and the outer circumference of the substrate 10 is a substantially flat surface 14. A braze material layer 16 is provided between the outer peripheral edge 4 of the diaphragm 2 and the surface 14 to bond the outer peripheral edge 4 to the substrate 10. The groove 12 functions as a moat to receive any excess braze material from the layer 16 therein. The radially inward wall of the groove 12 extends above the surface 14 to form one side of a dam 18 in the form of a raised lip on the radially inward edge of the substrate 10. The dam 18 restrains the flow of the excess braze material to the moat 12 while providing a radially inward support for the diaphragm 2. Thus, the dam 18 projecting above the surface 14 is arranged to directly contact the diaphragm 2 and is dimensioned in height to match the thickness of the braze material layer 16 whereby the outer peripheral edge of the diaphragm 2 is uniformly supported between the top of the dam 18 and the outer circumference of the substrate 10, and the excess braze material is confined to the moat 12.

Figure 3:
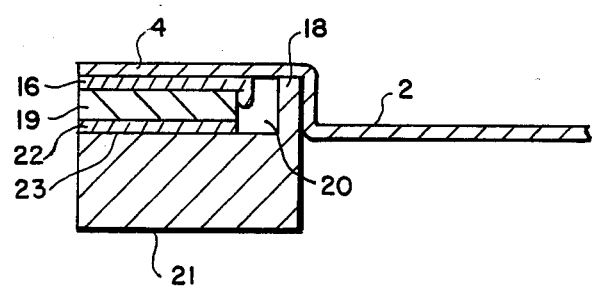
FIG. 3 is an alternate embodiment of the structure shown in FIG. 2

In FIG. 3, there is shown an alternate embodiment of the structure in FIG. 2. In this embodiment, the flexible diaphragm 2 is also supported by the dam 18. However, a moat 20 to receive the excess braze material is formed by a gap between a radially inward periphery of a support ring 19 which is brazed to a substrate 21 by a braze material layer 22 and a radially outward side of the dam 18. The braze material layer 22 and the ring 19 are located on a radially outward flat surface 23 extending from the radially outward side of the dam 18 to the outer periphery of the substrate 21 whereby the outer peripheral edge of the diaphragm 2 is uniformly supported between the top of the dam 18 and the outer circumference of the substrate 21 while the excess braze material from the layers 16 and 22 is confined to the moat 20. In this arrangement, the height of the dam 18 above the surface 23 is matched by the combined thickness of the braze material 16, the ring 19 and the braze material 22. The ring 19 is, in turn, brazed to the outer peripheral surface of the diaphragm 2 by the braze layer 16.

Figure 4:
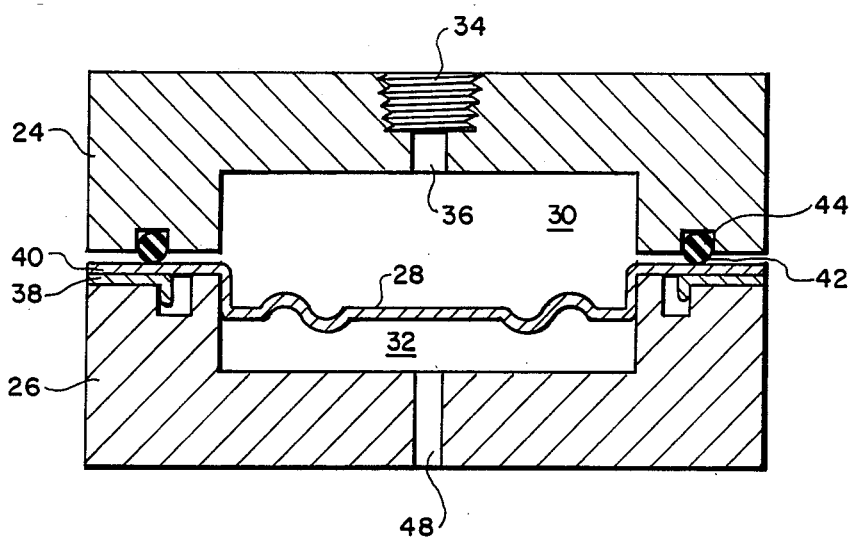
FIG. 4 is a cross-section illustration of a transducer apparatus using the bonding technique shown in FIG. 2.

In FIG. 4, there is shown an example of a transducer apparatus utilizing the embodiment of the bonding technique discussed above with respect to FIG. 2. In this transducer apparatus, a cover 24 is combined with a transducer housing 26 to form a transducer apparatus. The cover 24 and the housing 26 may be of any suitable material, e.g., stainless steel. A flexible diaphragm 28 is arranged to divide a space 30 within the cover 24 from a space 32 within the housing 26. A fluid inlet connection 34 is provided in the cover 24 to allow the connection of a fluid inlet line (not shown). A fluid port 36 is arranged to admit the fluid from the inlet line to the space 30 within the cover 24. The diaphragm support substrate is provided by a radially outward surface 38 on the housing 26 which surface is attached to the one side of the outer periphery of the diaphragm 28 by a braze alloy layer 40 using the aforesaid bonding technique. The other side of outer periphery of the diaphragm 28 is provided with a fluid-type seal to the cover 24 by an O-ring 42 retained in a recess 44 within the cover 24. The cover 24 is attached to the housing 26 by any suitable means, e.g., bolts (not shown). A port 48 is provided within the housing 26 to connect the space 32 to a fluid pressure sensing transducer which may be a conventional strain sensing element (not shown). A substantially incompressible fluid is used to fill the space 32 and the port 48 to transmit a fluid pressure from the diaphragm 28 to the strain sensitive element which would provide an electrical output signal representative of the fluid pressure applied to the transducer apparatus from the fluid inlet port 36. While the specific example of a fluid transducer apparatus shown in FIG. 4 uses the bonding technique and structure shown in FIG. 2, it should be noted that the alternate embodiment shown in FIG. 3 may also be used and that either embodiment may also be used in other structures to provide a fluid-type seal between a thin, flexible member and a support substrate.

Accordingly, it may be seen that there has been provided, in accordance with the present invention, an improved method of producing a fluid-tight seal to a thin, flexible member and an apparatus utilizing the same.

The embodiments of the invention in which an exclusive property or privilege is claimed are defined as follows:

1. A method of producing a fluid-tight seal between a thin, flexible member and a member support including the steps of providing a moat for receiving excess braze material on an external surface of the member support and a dam adjacent to the moat to confine the excess braze material to the moat and having a height above the bottom of the moat to extend the dam past the external surface of the member support to accommodate the thickness of the braze material on the external surface of the member support used for a brazing of the member to the external surface, positioning the member to extend across the dam and the external surface while contacting only the top of the dam and brazing the member to the external surface while maintaining the contact between the top of the dam and the member to uniformly support the member.

2. The method as set forth in claim 1 and including the further steps of providing an intermediate support element between the member and the support and spaced from the dam to form the moat and brazing the element to the surface and to the member.

3. A fluid-tight seal for a thin, flexible member comprising
 a support surface,
 an excess braze material receiving moat on said surface,
 brazing material means between said member and surface and adjacent to one side of said moat and
 a dam adjacent to the other side of said moat and having a height above the bottom of said moat to extend the dam past said brazing material means to contact said member while accommodating the thickness of the brazing material used for a brazing of said member to said surface.

4. A seal as set forth in claim 3 wherein said brazing material means includes an intermediate support element between said member and said support and spaced from said dam.

5. A seal as set forth in claim 4 wherein said moat is formed substantially between said element and said dam.

6. A seal as set forth in claim 3 wherein said flexible member is a circular diaphragm, said support surface is an annular surface and said dam is of a generally annular configuration.

7. A pressure transducer comprising
 a thin, flexible diaphragm,
 an annular support for said diaphragm,
 an excess braze material receiving moat located radially inwardly from an outer edge of said support,
 an annular dam on said surface adjacent to a radially inward side of said moat and having a height above a bottom of said moat to contact said diaphragm while accommodating a brazing of said diaphragm to said support and
 brazing material means between said diaphragm and said support to attach said diaphragm to said support.

8. A transducer as set forth in claim 7 wherein said braze material means includes a support ring and braze material attaching said ring to said diaphragm and said surface.

* * * * *